United States Patent [19]

Nakatsuji et al.

[11] Patent Number: 5,321,090
[45] Date of Patent: Jun. 14, 1994

[54] POLYVINYL CHLORIDE RESIN POWDER COMPOSITION AND PRODUCTION THEREOF

[75] Inventors: Yoshihiro Nakatsuji, Toyonaka; Toshio Igarashi, Kyoto; Akira Wakatsuki, Ibaraki; Yuu Shida, Takatsuki; Hikaru Shimizu, Osaka, all of Japan

[73] Assignee: Sumitomo Chemical Company, Limited, Osaka, Japan

[21] Appl. No.: 971,460

[22] Filed: Nov. 4, 1992

[30] Foreign Application Priority Data

Nov. 8, 1991 [JP] Japan ................................ 3-292803

[51] Int. Cl.$^5$ ................... C08L 27/06; C08L 33/02; C08L 33/14; C08K 5/00
[52] U.S. Cl. ................................. 525/221; 525/223; 524/522; 524/523; 521/75
[58] Field of Search ................. 525/221, 223, 227; 526/320; 521/75; 524/522, 523

[56] References Cited

U.S. PATENT DOCUMENTS 2,686,172  8/1954  Wolf .................................. 526/320
4,956,222  9/1990  Matsuura et al. ................. 521/75

FOREIGN PATENT DOCUMENTS 46-34099  10/1971  Japan .
60-90221   5/1985  Japan .
61-136542  6/1986  Japan .
34786      7/1987  Japan .
576110     3/1946  United Kingdom .
2015005    9/1979  United Kingdom .

*Primary Examiner*—Carman J. Seccuro, Jr.
*Attorney, Agent, or Firm*—Wenderoth, Lind & Ponack

[57] ABSTRACT

Disclosed is a polyvinyl chloride resin powder composition containing (A) a granular polyvinyl chloride resin and (B) a fine granular vinyl chloride copolymer resin containing a copolymer composed of a vinyl chloride monomer and a carbonyloxy group-containing vinyl monomer, along with a stabilizer and a plasticizer. The composition is suitable for powder molding to produce covering materials of automotive interiors.

16 Claims, No Drawings

POLYVINYL CHLORIDE RESIN POWDER COMPOSITION AND PRODUCTION THEREOF

BACKGROUND OF THE INVENTION

1. Field of the Invention

The present invention relates to a polyvinyl chloride resin powder composition and also to a process for producing the same.

2. Description of the Prior Art

The recent trend in the automotive interior covering materials for crash pad, armrest, headrest, console box, meter hood, door trim, etc. is toward those which are not only light in weight but also soft to the touch and quality-looking owing to embossing for the leather-like finish and stitch-like pattern.

These covering materials are conventionally produced by the powder slush molding method which consists of contacting a powder composition with a heated mold, thereby causing particles to fust together, and removing excess powder remaining unfused, said powder composition being formed by dry-blending polyvinyl chloride resin, plasticizer, stabilizer, pigment, etc.

The product from the powder composition is often backed with a polyurethane layer to be made into a covering material. The thus obtained covering material has a disadvantage of being poor in adhesion between the polyvinyl chloride resin layer and the polyurethane layer.

In order to overcome the disadvantage, there has been proposed an improved polyvinyl chloride resin powder composition comprising the above-mentioned composition and a polypropylene glycol or polyether polyol (Japanese Patent Kokai No. 136542/1986).

The composition is, however, not satisfactory because it does not adhere uniformly to the mold or the excess composition is not removed uniformly after fusing in powder molding so that the composition-causes so-called powder dropping. Thus, -the resulting covering material greatly fluctuates in thickness, and when a polyurethane layer is laminated to it, the surface of the laminate product is defectively uneven.

With the foregoing in mind, the present inventors carried out a series of researches which led to the finding that a powder composition containing a fine granular vinyl chloride copolymer resin, which contains a specific copolymer composed of a vinyl chloride monomer and a carbonyloxy group-containing vinyl monomer, has the good property of powder dropping and gives a covering material having uniform thickness and good adhesion to a polyurethane layer. Further making additional various investigations, they have completed the present invention on the basis of the finding.

SUMMARY OF THE INVENTION

Accordingly, the present invention provides a polyvinyl chloride resin powder composition containing (A) a granular polyvinyl chloride resin and (B) a fine granular vinyl chloride copolymer resin containing a copolymer composed of a vinyl chloride monomer and a carbonyloxy group-containing vinyl monomer, along with a stabilizer and a plasticizer. It also provides a method or producing the composition and a method of producing a covering material from the composition.

DETAILED DESCRIPTION OF THE INVENTION

The present invention will be explained in detail hereunder.

The granular polyvinyl chloride resin (A) for use in the present invention includes, for example, a vinyl chloride polymer, a copolymer composed of vinyl chloride and monomer(s) capable of copolymerizing with vinyl chloride, such as ethylene, propylene or vinyl acetate, and a vinyl chloride graft copolymer formed by grafting vinyl chloride to an ethylene-vinyl acetate copolymer, which, however, are not limitative. A mixture comprising two or more (co)polymers may be used.

The granular polyvinyl chloride resin (A) has a particle size of generally from 100 to 150 $\mu$m, and it may be produced, in general, by suspension polymerization or bulk polymerization.

The fine granular vinyl chloride copolymer resin (B) for use in the present invention is one for coating the above-mentioned granular polyvinyl chloride resin (A), and it has a particle size of generally from 0.1 to 10 $\mu$m and may be produced, for example, by emulsion polymerization or micro-suspension polymerization.

The component (B) includes, for example, a copolymer composed of a vinyl chloride monomer and a carbonyloxy group-containing vinyl monomer of the following formula (1), and a mixture comprising the copolymer and a vinyl chloride homopolymer and a copolymer composed of a vinyl chloride monomer and other monomer(s) than the comonomer of formula (1), such as ethylene or propylene.

where $R_1$ represents a hydrogen atom, a lower alkyl group or a carboxyl group; $R_2$ represents a hydrogen atom or a lower alkyl group; and $R_3$ represents a hydrogen atom or a lower hydroxyalkyl group.

$R_1$ of the carbonyloxy group-containing vinyl monomer (1) includes, for example, a hydrogen atom, a lower alkyl group such as a methyl, ethyl, propyl, butyl or pentyl group, and a carboxyl group. $R_2$ of the same includes, for example, a hydrogen atom, and the same lower alkyl group as that of $R_1$. $R_3$ of the same includes, for example, a hydrogen atom, and a lower hydroxyalkyl group such as a 2-hydroxyethyl, 2-hydroxypropyl, 3-hydroxypropyl or 3-hydroxybutyl group.

Specific examples of the carbonyloxy group-containing vinyl monomer (1) include 2-hydroxyethyl acrylate, 2-hydroxyethyl methacrylate, 3-hydroxybutyl acrylate, 2-hydroxybutyl methacrylate, acrylic acid, methacrylic acid, and monobutyl maleate. Of them, preferred are 2-hydroxyethyl acrylate and 2-hydroxyethyl methacrylate.

The content of the component (B) in the polyvinyl chloride resin powder composition of the present invention is generally from 3/97 to 20/80 by weight, to the granular polyvinyl chloride resin (A).

The content of the carbonyloxy group-containing vinyl monomer is preferably from 0.05 to 1 part by weight to 100 parts by weight of the total polyvinyl chloride resin (sum of the components (A) and (B)). If it is less than 0.05 part by weight, the adhesion of the covering material to be formed from the composition to urethanes would be insufficient, while if it is more than 1 part by weight, the powder dropping property of the composition would be poor. More preferably, it is from 0.1 to 0.6 part by weight.

The plasticizer for use in the present invention includes, for example, dialkyl phthalates in which each alkyl group has from 9 to 11 carbon atoms, such as diisodecyl phthalate and diisoundecyl phthalate; and trialkyl trimellitates in which each alkyl group has from 7 to 11 carbon atoms, such as trioctyl trimellitate, tri-2-ethylhexyl trimellitate and tridecyl trimellitate. However, these are not specifically limitative and any and every plasticizer which may be used in a resin composition for powder molding may be used. The amount of the plasticizer in the composition of the present invention may be generally from 40 to 120 parts by weight to 100 parts of the total polyvinyl chloride resin.

The stabilizer for use in the present invention includes, for example, compounds of metals such as zinc, barium, sodium, potassium, calcium, lithium or tin, such as metal carboxylates. In particular, a composite stabilizer composed of them is preferred. Along with the stabilizer, also usable are magnesium oxide, magnesium hydroxide, hydrotalcites, zinc oxide, barium oxide, calcium oxide and barium phosphate. Especially preferred is combination of a zinc-barium composite salt and a hydrotalcite, since the heat resistance of the urethane-laminated product from the composition is high.

The composition of the present invention may also contain, as a stabilizer, an antioxidant such as phenol compounds, thioether compounds and phosphorus compounds, a photo-stabilizer such as diketo compounds, salicylic acid compounds, benzophenone compounds, benzotriazole compounds and hindered amine compounds, as well as an epoxy compound. However, these are not specifically limitative and any and every stabilizer capable of being in a resin composition for powder molding may be used. The amount of the stabilizer in the composition of the present invention is generally from 3 to 15 parts by weight to 100 parts by weight of the total polyvinyl chloride resin.

The composition of the present invention may further contain, in addition to the plasticizer and stabilizer, other additives such as a foaming agent and a foaming auxiliary assistant, if desired.

As the foaming agent, for example, usable is a decomposable foaming agent such as azodicarbonamide, p,p'-hydroxybisbenzenesulfonyl hydrazide, p-toluenesulfonyl hydrazide and benzenesulfonyl hydrazide. These may be used as a mixture of two or more of them. Of them, especially preferred is azodicarbonamide.

Where the composition of the present invention contains the foaming agent, the content of the agent therein is generally from 1 to 10 parts by weight to 100 parts by weight of the total polyvinyl chloride resin.

If desired, the composition of the present invention may contain a foaming auxiliary assistant along with the foaming agent. The foaming auxiliary assistant includes, for example, inorganic zinc salts such as zinc flower and zinc nitrate, .zinc fatty acid soaps such as zinc octoate and zinc stearate, as well as urea. These may be used as a mixture of two or more of them. Where the composition of the present invention contains the foaming auxiliary assistant, the content of it in the composition is generally from 0.2 to 3 parts by weight to 100 parts by weight of the total polyvinyl chloride resin therein.

The composition of the present invention may further contain, if desired, other additives such as a filler (e.g., calcium carbonate) and a pigment (e.g., titanium oxide, carbon black), in addition to the above-mentioned components.

The composition of the present invention may be produced, in general, by dry-blending the component (A) and a plasticizer and a stabilizer and, optionally other additives such as a foaming agent and a foaming auxiliary assistant followed by adding the component (B) to the resulting dry blend. The temperature for the first stage dry-blending is generally from 60° to 130° C., and the temperature for the second stage blending is generally from 40° to 80° C.

Thus, the polyvinyl chloride resin composition for powder molding of the present invention-is obtained, and it is industrially advantageous as it has an excellent powder dropping property and may form a covering material having uniform thickness and good adhesion to a polyurethane layer.

EXAMPLES

The present invention will be explained in more detail by way of the following examples, which, however, are not limitative.

Example 1

Preparation of fine granular vinyl chloride copolymer

A. 100-liter glass-lining autoclave was charged with 40 kg of ion-exchanged water and 920 g, as the polymer ingredient, of polyvinyl chloride latex having an average particle size of 0.3 $\mu$m, and this was sealed with a lid and subjected to nitrogen substitution under reduced pressure. Afterwards, 34 kg of vinyl chloride monomer was added to the autoclave and the temperature therein was elevated up to 53° C. to start the polymerization, whereupon 0,004% by weight, as the total amount to vinyl chloride monomer, of hydrogen peroxide and 1.0 equivalent mol, as the total amount to hydrogen peroxide, of Rongalit were added thereto via separate lines throughout the whole polymerization period (13 hours) each at a constant rate. During the period of from the time of having the polymerization degree of 12% to the finish of the polymerization, an-emulsifier and a comonomer were continuously added to the autoclave. Precisely, sodium laurylsulfate was added as an emulsifier at a rate of 0.03% an hour to the vinyl chloride monomer and 2-hydroxyethyl acrylate was as a comonomer at a rate of 0.5% an hour to the same.

The polymerization was stopped after the polymerization pressure became lower than the saturated vinyl chloride vapor pressure by 1 kg/cm2 at 53° C. The non-reacted monomers were recovered and the resulting copolymer was spray-dried. The contents of sodium lauryl sulfate and 2-hydroxyethyl acrylate in the copolymer thus obtained were 0.3% by weight and 5% by weight, respectively. The vinyl chloride copolymer thus obtained had an average particle size of 1.0 $\mu$m.

Preparation of unfoamable resin composition for powder molding

A supermixer was charged with 90 parts by weight of granular polyvinyl chloride resin (produced by suspension polymerization, having an average particle size of 120 $\mu$m and an average degree of polymerization of 800). After heating to 80° C. with uniform stirring, the resin was dry-blended with 70 parts by weight of trimellitic ester plasticizer and 3 parts by weight of Ba-Zn stabilizer. Mixing was continued until the temperature of the mixture reached 125° C. Then the mixture was cooled to 50° C. The mixture was uniformly dispersed with 10 parts by weight of the previously obtained fine granular vinyl chloride copolymer to prepare a resin composition for powder molding.

Preparation of single-layer sheet from unfoamable resin composition for powder molding A nickel flat mold was pre-heated in a Geer oven of 280° C. for 10 minutes and taken out therefrom. The mold temperature was about 240° C. Immediately, the previously prepared unfoamable composition was sprinkled over the mold, and the excess composition was discharged therefrom after about 13 seconds. Then, the mold was put in a Geer oven having an ambient temperature of 240° C. and again heated therein for one minute and thereafter taken out. After cooling, the layer of the resin composition was released from the mold. Thus, there was obtained a molded sheet.

The resin composition was evaluated as follows. The results are shown in Table 1.

(1) Powder dropping property (removability of excess powder)

① Evaluated by observing the back of the molded sheet.
○: The thickness of the sheet is even.
△: The thickness of the sheet is somewhat uneven.
×: The thickness of the sheet is noticeably uneven.
② Evaluated by filling the resin composition (level, about 75 g) into an aluminum cup (73 mm in inside diameter and 25 mm high), heating the cup on a hot plate at 240° C. for 2 minutes, upsetting the aluminum cup, and measuring the amount of the resin composition remaining in the aluminum cup.

(2) Adhesion of the single-layer sheet to semirigid polyurethane resin

Evaluated by aging the single-layer sheet at 50° C. and 50% RH for 7 days, backing the single-layer sheet with an approximately 10 mm thick layer of semirigid polyurethane resin in a polyurethane foaming mold, cutting a 25-mm wide test piece out of the sample, and measuring the 180° peel strength between the layer of the polyvinyl chloride resin sheet and the layer of the semirigid polyurethane resin under the condition of 23° C. and a peeling rate of 200 mm/min.
○: Peeling occurred in the material. (This indicates good adhesion at the interface.)
×: Peeling occurred at the interface. (This indicates poor adhesion at the interface.)

Examples 2 and 3 and Comparative Example 1

Powder compositions were prepared in the same manner as in Example 1, except that 10 parts by weight of fine granular vinyl chloride copolymer containing 2, 20 and 0% by weight, respectively, of 2-hydroxyethyl acrylate was used. The compositions were molded in the same manner as in Example 1 to give molded sheets. The sheets were evaluated and the results are shown in Table 1.

Comparative Example 2

A resin composition for powder molding was prepared in the same manner as in Example 1, except that 2 parts by weight of polypropylene glycol was incorporated in addition to the plasticizer and the stabilizer in dry-blending and that fine granular vinyl chloride homopolymer was used in place of the fine granular vinyl chloride copolymer. This was molded into a molded sheet.

This was evaluated in the same manner as in Example 1, and the results are shown in Table 1.

Comparative Example 3

A powder composition was prepared in the same manner as in Example 1, except that 2 parts by weight of polyether polyol (Sumiphen 3063, produced by Sumitomo Bayer Urethane Co.) was incorporated in addition to the plasticizer and the stabilizer in dry-blending and that fine granular vinyl chloride homopolymer was used in place of the fine granular vinyl chloride copolymer. This was molded into a molded sheet in the same manner as in Example 1.

This was evaluated in the same manner as in Example 1, and the results are shown in Table 1.

TABLE 1

| | Example | | | Comparative Example | | |
|---|---|---|---|---|---|---|
| | 1 | 2 | 3 | 1 | 2 | 3 |
| 2-Hydroxyethyl Acrylate (wt. pts.) | 0.5 | 0.2 | 2.0 | 0 | poly-propylene glycol | poly-ether polyol |
| Adhesion | ○ | ○ | ○ | × | ○ | ○ |
| Powder Dropping Property | | | | | | |
| Back of sheet | ○ | ○ | △ | ○ | × | × |
| Amount adhering to cup (g) | 25.3 (A) | 25.2 (A) | 27.5 (A) | 25.0 (B) | 31.8 (A) | 35.7 (A) |
| Difference between (A) and (B), (g) | 0.3 | 0.2 | 2.5 | 0 | 6.8 | 10.7 |

Example 4

Preparation of foamable resin composition for powder molding

A supermixer was charged with 90 parts by weight of granular polyvinyl chloride resin (produced by suspension polymerization, having an average particle size of 120 μm and an average degree of polymerization of 800). After heating to 80° C. with uniform stirring, the resin was dry-blended with 70 parts by weight of trimellitic ester plasticizer, 3 parts by weight of Ba-Zn stabilizer, 1.5 parts by weight of azodicarbonamide and one part by weight of Zinc flower. Mixing was continued until the temperature of the mixture reached 125° C. Then the mixture was cooled to 50° C. The mixture was uniformly dispersed with 10 parts by weight of fine granular vinyl chloride copolymer containing 5% by weight of 2-hydroxyethyl acrylate unit to prepare a resin composition for powder molding.

Preparation of two-layer sheet from unfoamable resin composition for powder molding and foamable resin composition for powder molding A nickel flat mold was pre-heated in a Geer oven of 280° C. for 10 minutes and taken out therefrom. The mold temperature was about 240° C. Immediately, the same unfoamable powder composition as that obtained in Comparative Example 1 (composition containing no 2-hydroxyethyl acrylate unit) was sprinkled over the mold, and the excess composition was discharged therefrom after about 5 seconds. Then, the previously prepared foamable resin composition was sprinkled thereover, and the excess composition was discharged therefrom after about 15 seconds. The mold was put in a Geer oven having an ambient temperature of 240° C.

and again heated therein for one minute for foaming and thereafter taken out. After cooling, the molded sheet was released and taken out from the mold.

The resin composition was evaluated as follows. The results are shown in Table 1.

(1) Adhesion of two-layer sheet to rigid urethane

Evaluated by aging the two-layer sheet at 25° C. and 50% RH for one day, backing the two-layer sheet with an approximately 10 mm thick layer of rigid polyurethane resin in a polyurethane foaming mold, cutting a 25-mm wide test piece out of the sample, and measuring the 180° peel strength between the polyvinyl chloride resin sheet and the layer of the polyurethane resin under the condition of 23° C. and a peeling rate of 200 mm/min.

Evaluation was effected in the same manner as in Example 1. The results obtained are shown in Table 2.

Examples 5 and 6 and Comparative Example 4

Preparation of foamable resin composition for powder molding:

Foamable resin compositions for powder molding were prepared in the same manner as in Example 4, except that 10 parts by weight of fine granular vinyl chloride copolymer containing 2, 20 and 0% by weight, respectively, of 2-hydroxyethyl acrylate was used. The compositions were molded in the same manner as in Example 1 to give molded sheets. The sheets were evaluated and the results are shown in Table 2.

Comparative Example 5

A foamable resin composition was prepared in the same manner as in Example 4, except that 2 parts by weight of polypropylene glycol was incorporated in addition to the plasticizer, the stabilizer, azodicarbonamide and zinc flower in dry-blending and that fine granular vinyl chloride homopolymer was used in place of the fine granular vinyl chloride copolymer. This was molded into a molded sheet.

This was evaluated in the same manner as above, and the results are shown in Table 2.

Comparative Example 6

A foamable resin composition was prepared in the same manner as in Example 4, except that 2 parts by weight of polyether polyol was incorporated in addition to the plasticizer, the stabilizer, azodicarbonamide and zinc flower in dry-blending and that fine granular vinyl chloride homopolymer was used in place of the fine granular vinyl chloride copolymer. This was molded into a molded sheet in the same manner as in Example 4.

This was evaluated in the same manner as above, and the results are shown in Table 2.

TABLE 2

|  | Example | | | Comparative Example | | |
|---|---|---|---|---|---|---|
|  | 4 | 5 | 6 | 4 | 5 | 6 |
| 2-Hydroxyethyl Acrylate (wt. pts.) | 0.5 | 0.2 | 2.0 | 0 | polypropylene glycol | polyether polyol |
| Peeling Strength (kg/25 mm) | 1.25 | 1.05 | 1.65 | 0.20 | 0.40 | 0.3 |
| Powder Dropping Property |  |  |  |  |  |  |
| Back of sheet | ○ | ○ | Δ | ○ | X | X |
| Amount adhering to cup (g) | 25.5 (A) | 25.3 (A) | 27.8 (A) | 25.0 (B) | 32.1 (A) | 35.8 (A) |
| Difference between (A) | 0.5 | 0.3 | 2.8 | 0 | 7.1 | 10.8 |

TABLE 2-continued

|  | Example | | | Comparative Example | | |
|---|---|---|---|---|---|---|
|  | 4 | 5 | 6 | 4 | 5 | 6 |
| and (B), (g) |  |  |  |  |  |  |

We claim:

1. A polyvinyl chloride resin powder composition consisting essentially of (A) a granular polyvinyl chloride resin having a particle diameter of 100–150 μm and (B) a fine granular vinyl chloride copolymer resin having a particle diameter of 0.1 to less than 10 μm, consisting essentially of a copolymer consisting essentially of a vinyl chloride monomer and a carbonyloxy group-containing vinyl monomer of the formula

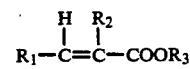

where $R_1$ represents a hydrogen atom, a lower alkyl group or a carboxyl group; $R_2$ represents a hydrogen atom or a lower alkyl group; and $R_3$ represents a hydrogen atom or a lower hydroxyalkyl group, along with a stabilizer and a plasticizer and optionally, a foaming agent.

2. The composition as claimed in claim 1, in which the carbonyloxy group-containing vinyl monomer is at least one monomer to be selected from the group consisting of 2-hydroxyethyl acrylate, 2-hydroxyethyl methacrylate, 3-hydroxybutyl acrylate, 2-hydroxybutyl methacrylate, acrylic acid, methacrylic acid and monobutyl maleate.

3. The composition as claimed in claim 1, in which the carbonyloxy group-containing vinyl monomer is at least one monomer to be selected from the group consisting of 2-hydroxyethyl acrylate and 2-hydroxyethyl methacrylate.

4. The composition as claimed in claim 1, in which the ratio of (B) to (A) is from 3/97 to 20/80 by weight.

5. The composition as claimed in claim 4, in which the content of the carbonyloxy group-containing vinyl monomer component is from 0.05 to 1 part by weight to 100 parts by weight of the sum of the components (A) and (B).

6. A method of preparing a polyvinyl chloride resin powder composition, which consists essentially of dry-blending (A) a granular polyvinyl chloride resin having a particle diameter of 100 to 150 μm (A) with a stabilizer and a plasticizer optionally along with a foaming agent and a foaming auxiliary, assistant and then mixing the resulting blend with (B) a fine granular vinyl chloride copolymer resin having a particle diameter of 0.1 to less than 10 μm consisting essentially of a copolymer consisting essentially of a vinyl chloride monomer and a carbonyloxy group-containing vinyl monomer of the formula

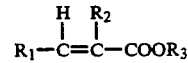

where $R_1$ represents a hydrogen atom, a lower alkyl group or a carboxyl group; $R_2$ represents a hydrogen atom or a lower alkyl group; and $R_3$ represents a hydrogen atom or a lower hydroxyalkyl group.

7. The method as claimed in claim 6, in which the carbonyloxy group-containing vinyl monomer is at least one monomer to be selected from the group consisting of 2-hydroxyethyl acrylate and 2-hydroxyethyl methacrylate. 3-hydroxybutyl acrylate, 2-hydroxybutyl methacrylate, acrylic acid, methacrylic acid and monobutyl maleate.

8. The method as claimed in claim 6, in which the carbonyloxy group-containing vinyl monomer is at least one monomer to be selected from the group consisting of 2-hydroxyethyl acrylate and 2-hydroxyethyl methacrylate.

9. The method as claimed in claim 6, in which the ratio of (B) to (A) is from 3/97 to 20/80 by weight.

10. The method as claimed in claim 9, in which the content of the carbonyloxy group-containing vinyl monomer component in the component (B) is from 0.05 to 1 part by weight to 100 parts by weight of the sum of the components (A) and (B).

11. A method of preparing a covering material, in which a polyvinyl chloride resin powder composition consisting essentially of (A) a granular polyvinyl chloride resin having a particle diameter of 100–150 μm and (B) a fine granular vinyl chloride copolymer resin having a particle diameter of 0.1 to less than 10 μm consisting essentially of a copolymer consisting essentially of a vinyl chloride monomer and a carbonyloxy group-containing vinyl monomer of the formula

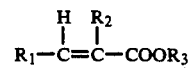

where $R_1$ represents a hydrogen atom, a lower alkyl group or a carboxyl group; $R_2$ represents a hydrogen atom or a lower alkyl group; and $R_3$ represents a hydrogen atom or a lower hydroxyalkyl group, along with a stabilizer and a plasticizer and optionally a foaming agent is molded by powder molding.

12. The method as claimed in claim 11, in which the carbonyloxy group-containing vinyl monomer is at least one monomer to be selected from the group consisting of 2-hydroxyethyl acrylate, 2-hydroxyethyl methacrylate, 3-hydroxybutyl acrylate, 2-hydroxybutyl methacrylate, acrylic acid, methacrylic acid and monobutyl maleate.

13. The method as claimed in claim 11, in which the carbonyloxy group-containing vinyl monomer is at least one monomer to be selected from the group consisting of 2-hydroxyethyl acrylate and 2-hydroxyethyl methacrylate.

14. The method as claimed in claim 11, in which the ratio of (B) to (A) is from 3/97 to 20/80 by weight.

15. The method as claimed in claim 11, in which the content of the carbonyloxy group-containing vinyl monomer component is from 0.05 to 1 part by weight to 100 parts by weight of the sum of the components (A) and (B).

16. The composition as claimed in claim 1 wherein the fine granular vinyl chloride copolymer resin has a particle diameter of about 1.0 μm.

* * * * *